United States Patent
Zimmerman

(10) Patent No.: US 10,986,228 B2
(45) Date of Patent: *Apr. 20, 2021

(54) SYSTEM AND METHOD FOR MONITORING AND VISUALIZING EMOTIONS IN CALL CENTER DIALOGS BY CALL CENTER SUPERVISORS

(71) Applicant: International Business Machines Corporation, Armonk, NY (US)

(72) Inventor: Thomas G. Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/399,289

(22) Filed: Apr. 30, 2019

(65) Prior Publication Data

US 2019/0260875 A1  Aug. 22, 2019

Related U.S. Application Data

(63) Continuation of application No. 16/050,265, filed on Jul. 31, 2018, now Pat. No. 10,419,612, which is a
(Continued)

(51) Int. Cl.
*H04M 3/00* (2006.01)
*H04M 3/51* (2006.01)
*G10L 25/63* (2013.01)
*G10L 15/18* (2013.01)
*G06T 11/60* (2006.01)
(Continued)

(52) U.S. Cl.
CPC .......... *H04M 3/5175* (2013.01); *G06F 40/30* (2020.01); *G06F 40/35* (2020.01); *G06T 11/001* (2013.01); *G06T 11/206* (2013.01); *G06T 11/60* (2013.01); *G10L 15/1815* (2013.01); *G10L 15/1822* (2013.01); *G10L 25/63* (2013.01); *H04M 3/5133* (2013.01)

(58) Field of Classification Search
CPC .................. H04M 3/5175; G06F 17/2785
USPC ....... 379/265.01–265.14, 266.01–266.1, 309
See application file for complete search history.

(56) References Cited

U.S. PATENT DOCUMENTS 7,636,433 B2  12/2009  Noyan et al.
7,940,914 B2   5/2011  Petrushin
(Continued)

OTHER PUBLICATIONS

Anonymous, ip.com, Emotion Analysis in Live Chat Sessions, IPCOM000243071D, Sep. 11, 2015.
(Continued)

*Primary Examiner* — William J Deane, Jr.
(74) *Attorney, Agent, or Firm* — Terrile, Cannatti & Chambers, LLP; Michael Rocco Cannatti

(57) ABSTRACT

A method, system, and a computer program product are provided for monitoring an emotional state of a conversation by monitoring a communication between first and second persons to determine an emotional state of the communication, providing a visual representation of the emotional state of the communication for display to a person having access to the communication, and performing an intervention action to improve the emotional state of the communication in response to detecting the emotional state of the communication meets one or more specified intervention criteria.

20 Claims, 5 Drawing Sheets

Related U.S. Application Data continuation of application No. 15/341,661, filed on Nov. 2, 2016, now Pat. No. 10,135,979.

(51) Int. Cl.
| | | |
|---|---|---|
| *G06T 11/00* | (2006.01) | |
| *G06T 11/20* | (2006.01) | |
| *G06F 40/30* | (2020.01) | |
| *G06F 40/35* | (2020.01) | |

(56) References Cited

U.S. PATENT DOCUMENTS

| | | | |
|---|---|---|---|
| 7,983,910 | B2 | 7/2011 | Subramanian et al. |
| 8,380,794 | B2 | 2/2013 | Chakra et al. |
| 9,722,965 | B2 | 8/2017 | Cecchi et al. |
| 9,734,145 | B2 * | 8/2017 | Lee .................. G06F 17/2785 |
| 2003/0191627 | A1 | 10/2003 | Au |
| 2005/0088981 | A1 | 4/2005 | Woodruff et al. |
| 2007/0071206 | A1 | 3/2007 | Gainsboro et al. |
| 2008/0232612 | A1 * | 9/2008 | Tourwe .................. H03G 5/005 381/99 |
| 2012/0002848 | A1 | 1/2012 | Hill |
| 2013/0019187 | A1 | 1/2013 | Hind et al. |
| 2013/0063256 | A1 * | 3/2013 | Tartz ...................... G06F 3/005 340/407.1 |
| 2014/0140497 | A1 * | 5/2014 | Ripa .................. H04M 3/5133 379/265.06 |
| 2014/0205079 | A1 | 7/2014 | Griffin |
| 2015/0213002 | A1 * | 7/2015 | Gou ................... G06F 17/2785 704/9 |
| 2015/0213800 | A1 | 7/2015 | Krishnan et al. |
| 2016/0086088 | A1 | 3/2016 | Yehezkel et al. |
| 2016/0217807 | A1 * | 7/2016 | Gainsboro .......... H04M 3/2281 |
| 2016/0224803 | A1 | 8/2016 | Frank et al. |
| 2016/0302711 | A1 | 10/2016 | Frank et al. |
| 2017/0011577 | A1 * | 1/2017 | Frank .................... G06Q 10/00 |
| 2017/0084285 | A1 * | 3/2017 | Engdegard ............. G10L 19/20 |
| 2018/0101776 | A1 | 4/2018 | Osotio et al. |
| 2018/0270356 | A1 * | 9/2018 | Dumaine ............ G06K 9/00268 |

OTHER PUBLICATIONS

IBM, ip.com, An Emotion Broker to Convey Contextual Information to Enhance Communications, IPCOM000182883D, May 8, 2009.

IBM, ip.com, Method and apparatus to provide emotion sensitive feature for Instant Messenger, IPCOM000173710D, Aug. 21, 2008.

Riviello et al., Inferring Emotional Information from Vocal and Visual Cues: A Cross-Cultural Comparison, 2011 Second International Conference on Cognitive Infocommunications, Jul. 7-9, 2011, pp. 1-4.

Subramaniam, L. Venkata, Call Centres of the Future, Feb. 2008, www.itmagz.com, https://sites.google.com/site/lvs004/callcenters.pdf?attredirects=0.

voip-info.org, Call Center Monitoring, http://www.voip-info.org/wiki/view/Call+Center+Monitoring, 2016.

Kinesis, Call Center Agent Monitoring, http://www.kinesis-cem.com/Insights_Call_Center.shtml, 2014.

Reh, F. John, Call Center KPI, http://management.about.com/od/metrics/a/Call-Center-Kpi.htm, Apr. 25, 2016.

Reh, F. John, Quality Monitoring, http://management.about.com/od/metrics/a/Quality-Monitoring.htm, Apr. 25, 2016.

Wegge, J. et al., Journal of Managerial Psychology, Aug. 2010, http://www.sozialpsychologie.uni-frankfurt.de/wp-content/uploads/2010/09Wegge-et-al.-in-press-Emotional-dissonance-in-call-centre-work.pdf.

Chuang, Z. et al., Multi-Modal Emotion Recognition from Speech and Text, Computational Linguistics and Chinese Language Processing, vol. 9, No. 2, Aug. 2004, pp. 45-62, http://www.aclweb.org/anthology/O04-3004.

Schuller, B. et al., Mister D.J., Cheer Me Up!: Musical and Textual Features for Automatic Mood Classification, Journal of New Music Research, Routledge Taylor & Francis Group, vol. 39, No. 1, 2010, pp. 13-34, Screenshot of Abstract, http://www.tandfonline.com/doi/abs/10.1080/09298210903430475.

Eyben, F. et al., On-line Emotion Recognition in a 3-D Activation-Valence-Time Continuum using Acoustic and Linguistic Cues, Journal on Multimodal User Interfaces, Springer, Berlin/Heidelberg, ISSN 1783-7677, vol. 3, No. 1-2, pp. 7-12, Mar. 2010.

Nice Systems Ltd., NICE Speech Analytics, Why Combining Phonetics and Transcription Works Best, An Overview of the Industry's First Hybrid Speech Analytics Technology, http://www.nice.com/speech-analytics, Downloaded Jul. 8, 2016.

Zhao, J. et al., PEARL: An Interactive Visual Analytic Tool for Understanding Personal Emotion Style Derived From Social Media, Proceedings of the IEEE Symposium on Visual Analytics Science and Technology, pp. 203-212, 2014, http://www.cs.toronto.edu/~jianzhao/papers/pearl.pdf.

High, R., "The Era of Cognitive Systems: An Inside Look at IBM Watson and How it Works," IBM Redbooks, 2012.

Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

List of IBM Patents or Applications Treated as Related.

* cited by examiner

SYSTEM AND METHOD FOR MONITORING AND VISUALIZING EMOTIONS IN CALL CENTER DIALOGS BY CALL CENTER SUPERVISORS

BACKGROUND OF THE INVENTION

Field of the Invention

The present invention is directed in general to the field of call centers. In one aspect, the present invention relates to an information handling system, method, and apparatus for monitoring the emotional content call center dialogs.

Description of the Related Art

Call centers are well known today to handle a variety of requests or problems that arise between customers and companies. For example, some call centers in the form of "help desks" assist customers with problems with their computer hardware or software or other products. Other call centers assist customers with purchasing products or services or in billing matters or provide information about products or services. A large call center typically employs many personnel to assist the caller, to help fix a problem, to answer the caller's questions, or to transact business. The nature of call center work can create emotionally stressful work conditions that arise from crowded conditions at the center, from the stressful nature of communications with customers who are frustrated or disappointed with their purchase, from misunderstandings between the customer(s) and call center agent, and other factors. While contact center agent interactions are typically guided by a script or flowchart to facilitate the customer experience, the human nature of the participants means that customers can respond both positively and negatively to the language and attitude exhibited by the agent, and agents can, despite training, still convey attitudes and emotions with their language that can affect a customer negatively, adversely affecting the customer's attitude and behavior towards the company. While Key Performance Indicators (KPI) (e.g., call abandon rate, call handling time, first call resolution, transfer rate, idle and hold time) can be used to evaluate the success of a call center, most quality measurements, including phone etiquette and agent behavior, are either not monitored or sporadically monitored by having a supervisor listen to the calls of a single, randomly-selected agent, limiting a supervisor to monitor one agent at a time. Unfortunately, this approach results in supervisor interventions which misses calls that are likely to run into trouble or that have already escalated the customer's frustration and anger level, and/or which fail to find a more appropriate agent that is better matched to the emotional state of the caller. As a result, the existing solutions for monitoring the emotional content call center dialogs are inefficient and ineffective at a practical level.

SUMMARY

Broadly speaking, selected embodiments of the present disclosure provide a system, method, and apparatus for dynamically monitoring the emotional state of a conversation or dialog, such as a customer call to a call center, to assist, monitor, and improve human conversation and conversation interaction. In selected embodiments, the system, method, and apparatus provide an estimate the emotional state of one or more persons engaged in a conversation, and then visually present the emotional state estimate to a participant in the conversation for monitoring and/or interventions, such as conversational suggestions, to improve the quality and outcome of conversations. Selected embodiments may be embodied with program instructions which detect emotionally charged words used in the call center dialogs or exchanges between the customers and human and/or robot agents handling calls to the call center. The emotionally charged words may be detected by extracting valence and arousal values from the detected speech of contact center agents and customers to form an emotional vector representation of the emotional state of each dialog which may optionally be filtered to maintain a measure of latent emotions in the dialog. In selected embodiments, the interaction of emotions between the contact center agents and customers may be measured and represented with a simplified visual representation of the emotional state of the customer dialog, such as a color-coded time series trace or timeline in which encoded colors represent various emotional traits. With a simplified visual representation of the emotional state of the customer dialog, the agent may be provided with compact and space-efficient visual feedback reflecting the emotional state of the agent's current customer dialog, enabling the agent to monitor and control their emotional state and/or the emotional state of the customer, such as by providing the agent conversational suggestions to help the agent guide the conversation towards a desired outcome. In addition, a supervisor may be provided with simplified visual representations of the emotional state of multiple customer dialogs being handled by call center agents, enabling the supervisor to monitor the emotional status of multiple agents engaged in conversations with customers, to select and listen in on conversations that are emotionally charged (e.g. "problem calls"), and/or to automatically intervene in a conversation that has reached an undesired state. Such interventions can include interjecting another call center agent with attributes better suited to deal with the customer.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
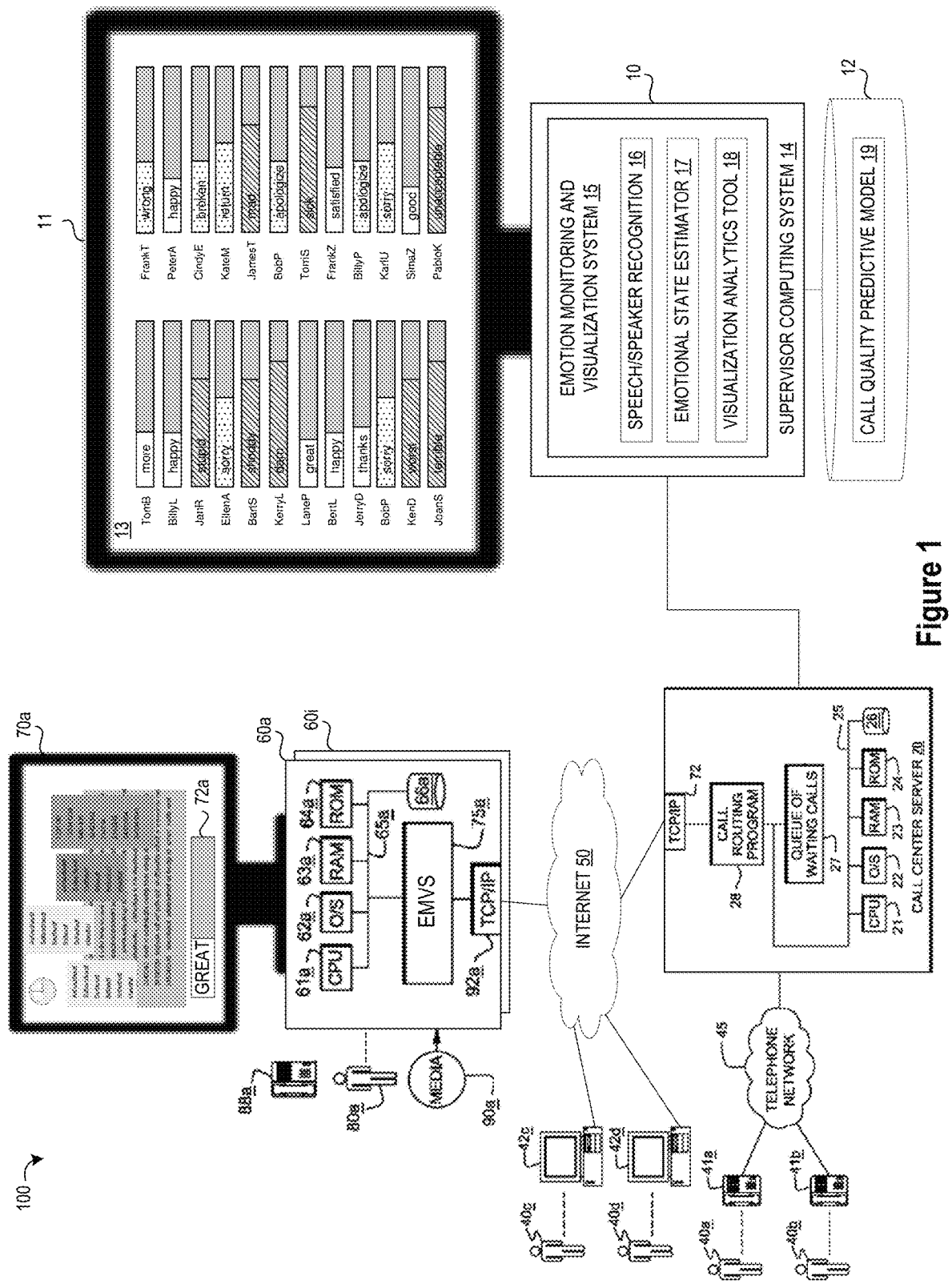
FIG. 1 depicts a system diagram of a call center that uses an emotion monitoring and visualization system to evaluate the emotional content of call center dialogs.

The present invention may be a system, a method, and/or a computer program product. In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. Thus embodied, the disclosed system, a method, and/or a computer program product is operative to improve the functionality and operation of a data processing system for helping call center personal to monitor the emotional state of call center dialogs by providing visual representations of the emotional state to the call center agent and/or supervisor based on a calculated emotional state derived from the valence and arousal emotion model values derived from the call center dialog.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a call center system 100 having a network of computing devices (e.g., 20, 42a-d, 60a-i) connected over a network 50 to a first data processing or computing system 14 and associated display screen 11 for displaying a user interface 13. The depicted network 50 is the medium used to provide communication links between various devices and computers connected together within the call center system 100, and may include one or more wired and/or wireless data communication links, where each communication link may comprise one or more of wires, fiber optic cables routers, switches, transmitters, receivers, or the like. Thus connected, one or more of the computing devices (e.g., supervisor computing system 10 or call center agent workstation 60a) may be specifically configured to implement an emotion monitoring and visualization system (EMVS) (e.g., 15, 75a) which evaluates the emotional content of call center dialogs and displays a visual representation of the emotional state of one or more dialogs. As will be appreciated, the configuring of the computing device(s) may comprise the providing of application specific hardware, firmware, or the like to facilitate the performance of the operations and generation of the outputs described herein with regard to the illustrative embodiments. In addition or in the alternative, the configuring of the computing device(s) may include storing software applications in one or more storage devices and loaded into memory of a computing device, such as server 10 or workstation 60a, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates improved call center performance by automatically detecting the emotional stress of the customer-agent conversation and automatically connecting a supervisor with a distressed call and/or automatically enlist the help of a more appropriate agent by matching the emotional state of the customer with an agent with a more compatible psychological profile.

As shown in FIG. 1, the call center system 100 may include a call center server 20 with one or more CPUs 21, operating system 22, RAM 23, and ROM 24 connected across a common bus 25 to storage 26. At the call center server 20, a call routing program 28 is operative to route calls to available, qualified call center personnel based on their skill type (compared to the skill required to handle the call), cost and availability. As each call arrives at the call center server 20, the call routing program 28 may place the call on a queue of waiting calls 27 and then determine the type of skill required to handle the call based on telephone prompts or computer queries to the caller to then routes the call to a qualified call center personnel who is available based on a known call routing algorithm. There are many known algorithms that can be implemented by call routing program 28, such as to route the call to the next available call center personnel with the requisite skill level or to route the call to the longest waiting call center personnel with the requisite skill level. Call routing program 28 can route the calls based in part on information provided by the caller describing the nature of the call. For example, call routing program 28 can make a series of telephone prompts to callers 40a,b via respective telephones 41a,b (via a telephone network 45) to identify the nature of the problem, or requested help, information, transaction or other service. For example, in the case of a computer help desk, the telephone prompts can elicit from the caller the type of product for which the caller needs help such as the type of computer hardware or software for which the caller is experiencing a problem or needs other assistance. In the case of a request for product information, the telephone prompts can elicit from the caller the type of product for which the caller needs information. In the case of a request to perform a service such as pay a bill or turn-on or repair cable television, the telephone prompts can elicit from the caller the type of service requested and the type of product requiring or associated with the service. The telephone prompts can elicit a wide range of information needed to route the call to a qualified call center person. With the foregoing information, the call routing program 28 can route the call to a person having the requisite skills and resources to provide the help, product information, transaction or other type of service. Similarly, callers 40c,d using workstations 42c,d can electronically request help, information, a transaction or a service via Internet 50 to call routing program 28 which provides a data input screen (e.g., a web page) to the callers

40c,d by which the caller specifies the nature of the problem or requested help, information, transaction or other service. For example, in the case of a help desk, the data input screen can elicit from the caller the type of product for which the caller needs help, such as the type of computer hardware or software. In the case of a request for product information, the data input screen can elicit from the caller the type of product for which the caller needs information. In the case of a request to perform a service such as pay a bill or turn-on or repair cable television, the data input screen can elicit from the caller the type of service requested and the type of product requiring or associated with the service. With the foregoing information, the call routing program 28 can route the call to a person having the requisite skills and resources to provide the help, product information, transaction or other type of service.

To handle the incoming calls, the call center system 100 may include a pool of call center personnel 80a-i (with telephones 88a-i and workstations 60a-i) that is connected directly or indirectly to the call center server 20. As depicted, the workstation 60a-i of the call center personnel 80a-i, respectively, include one or more CPUs (e.g., 61a), operating systems (e.g., 62a), RAM (e.g., 63a), and ROM (e.g., 64a) on common busses (e.g., 65a) and storage (e.g., 66a), respectively. Each workstations (e.g., 60a) may also include an emotion monitor client program 75a which is configured to monitor and display on the respective workstation display screen 70a a simplified visual representation 72a of the detected emotional content for the dialog in which agent the agent is engaged. The emotion monitor client program 75a can be loaded into each workstation (e.g., 60a) from computer readable media 90a, such as magnetic tape or disk, optical media, DVD, semiconductor memory, memory stick, etc. or downloaded from the Internet via TCP/IP adapter card 92a. However installed, the emotion monitor client program 75a may be configured to generate the simplified visual representation 72a as a space-efficient mechanism for notifying the agent about the current customer's emotional state, thereby minimizing the information displayed on the computer monitor display 70a which can already be cluttered with many open windows which reflect the multiple tasks and customer needs an agent must address. In selected embodiments, the simplified visual representation 72a is a simple space-efficient ambient display in the form of a dynamic colored bar graph that can be placed at the bottom or top of the screen to provide immediate visual feedback on the emotional state of the call. The dynamic colored bar graph 72a may include a color indication of the emotional state (e.g., red for "distressed," yellow for "fatigue" or "anxiety," and green for "calm" or "happy"), alone or in combination with a representative word or signifier corresponding to the detected emotional state of the dialog.

To supervise quality control and interactions for the incoming calls, the call center system 100 may include a first computing system 14 that is connected directly or indirectly to the call center server 20. In some illustrative embodiments, first computing system 14 may be a supervisor computing system that is embodied as the IBM Watson QA system available from International Business Machines Corporation of Armonk, N.Y., which is augmented with the mechanisms of the illustrative embodiments described hereafter. As will be appreciated, the supervisor computing system 14 may include one or more CPUs, operating systems, RAM, and ROM connected across one or more busses to storage 12. The supervisor computing system 14 may also be programmed with an emotion monitoring and visualization program 15 which is configured to monitor and display on the display screen 11 a user interface display 13 depicting simplified visual representations of the detected emotional content for a plurality of call center dialogs being monitored or supervised. The emotion monitoring and visualization program 15 can be loaded into the supervisor computing system 14 from computer readable media, such as magnetic tape or disk, optical media, DVD, semiconductor memory, memory stick, etc. or downloaded from the Internet via TCP/IP adapter card. However installed, the emotion monitoring and visualization program 15 may be configured to generate and display on the user interface display 13 simplified visual representations of the emotional content for multiple call center dialogs as space-efficient, dynamic colored bar graph icons to notify the supervisor about the current emotional states for a plurality of users currently interacting with call center agents. In the depicted example, the supervisor's user interface display 13 displays the real time emotional status of two dozen agents (e.g., TomB, BillyL, etc.), along with the particular emotional words being used by the agent or customer that determines the dynamic emotional state, thereby providing a salient summary of the emotional sentiment of all supervised calls. In particular, the user interface display 13 may display, for each call center agent being supervised, a dynamic bar graph which includes a graphic or color indication of the emotional state, alone or in combination with a representative word or signifier corresponding to the detected emotional state of the dialog. For example, a first color (e.g., red) or cross-hatched shading can be displayed for dialogs having a "distressed" emotional state, alone or in combination with a detected word (e.g., "stupid") from the dialog corresponding to the detected emotional state of the dialog. In addition, a second color (e.g., yellow) or polka-dotted shading can be displayed for dialogs having a "fatigue" or "anxiety" emotional state, alone or in combination with a detected word (e.g., "return") in the dialog corresponding to the detected emotional state of the dialog. In addition, a third color (e.g., green) or no shading can be displayed for dialogs having a "calm" or "happy" emotional state, alone or in combination with a detected word (e.g., "happy") from the dialog corresponding to the detected emotional state of the dialog.

As noted above, the mechanisms of the illustrative embodiments utilize specifically configured computing devices, or data processing systems, to perform the operations for personal branding assessment and product recommendation. These computing devices, or data processing systems, may comprise various hardware elements which are specifically configured, either through hardware configuration, software configuration, or a combination of hardware and software configuration, to implement one or more of the systems/subsystems described herein. For example, selected embodiments of the present disclosure can be implemented in whole or in part with different types of information handling systems that can range from small handheld devices, such as the handheld computer/mobile telephone to large mainframe systems, such as mainframe computer. Examples of handheld computer include personal digital assistants (PDAs), personal entertainment devices, such as MP3 players, portable televisions, and compact disc players. Other examples of information handling systems include pen, or tablet, computer, laptop, or notebook, computer, personal computer system, server, and mainframe computer. In addition, the various information handling systems can be networked together using various types of computer networks 50 that can include Personal Area Networks (PANs), Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores. An illustrative example of an information handling system showing an exemplary processor and various components commonly accessed by the processor is shown in FIG. 2.

Figure 2:
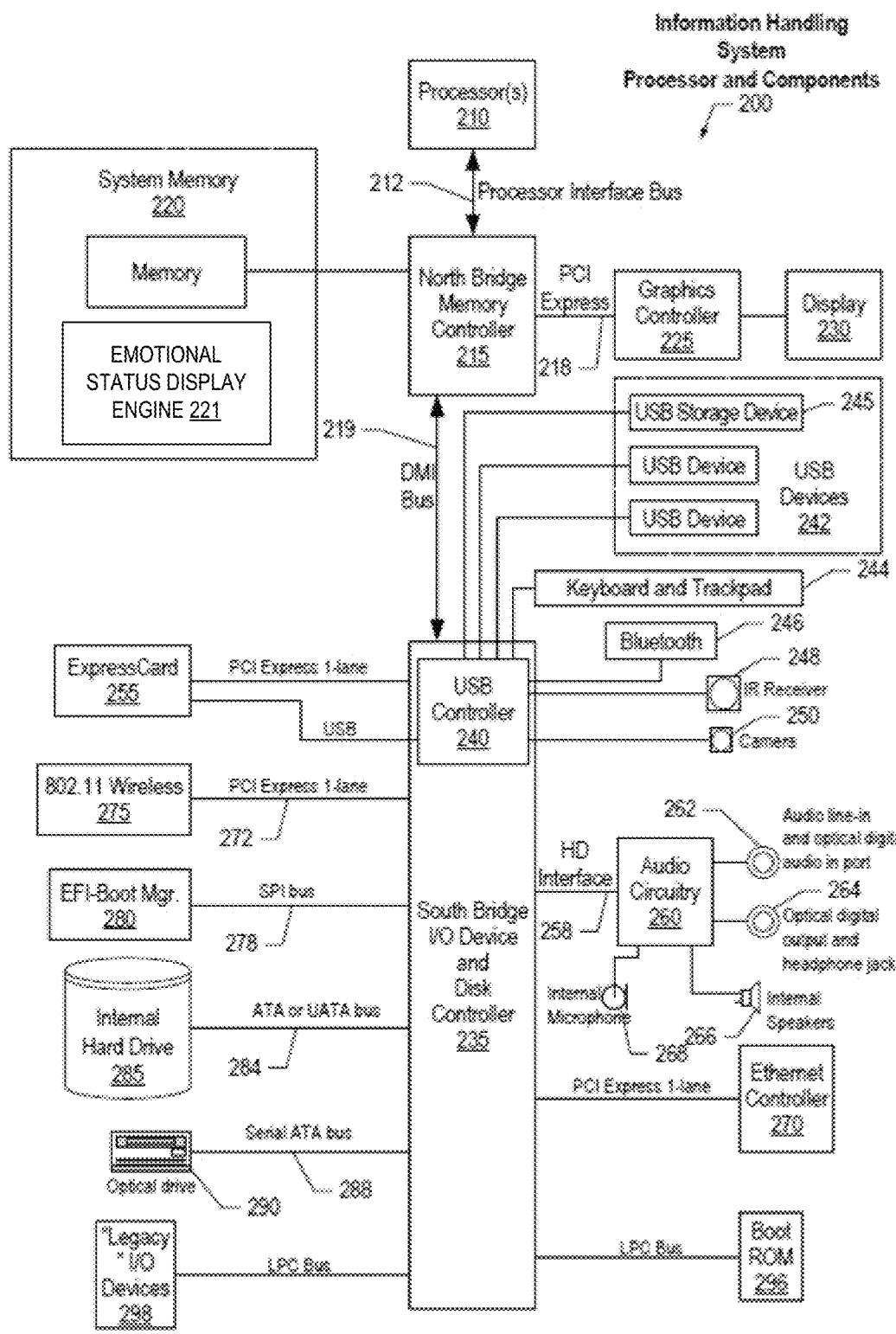
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory devices, including an emotional status display engine 221 which may be invoked to perform text-based emotional state estimation on a live voice call between a customer and call center agent to enable a supervisor to observe the emotional status of many agents simultaneously and automatically intervene on those in greatest need. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
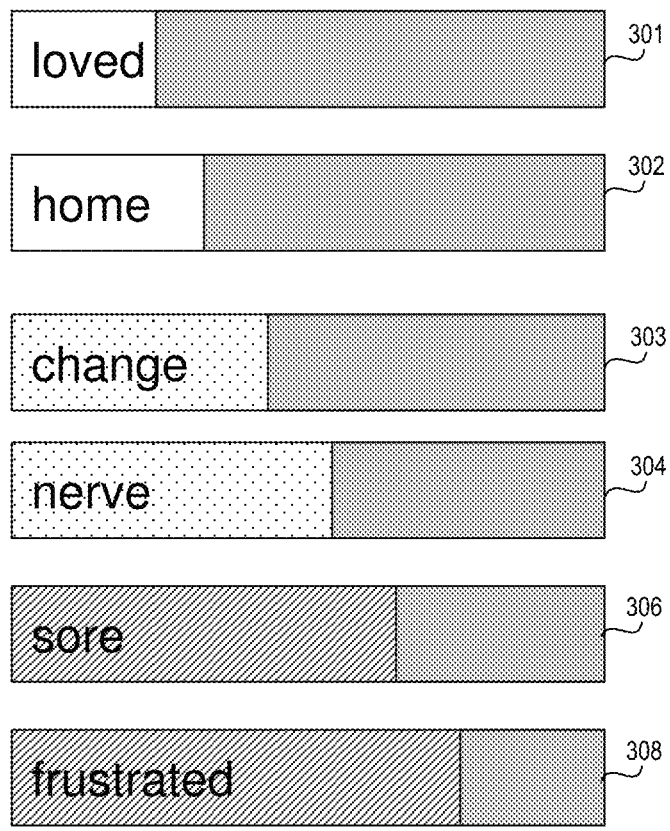
FIG. 3 depicts simplified visual representations of the emotional state of customer dialogs as emotional thermometers in accordance with selected illustrative embodiments of the present disclosure.

To provide additional details for an improved understanding of selected embodiments of the present disclosure, reference is now made to FIG. 3 which depicts a plurality of simplified visual representations 301-308 showing different emotional states of customer dialogs as emotional thermometers, each having a color and bar length corresponding to an emotional word detected in the call center dialog. In this example, the first emotional thermometer 301 graphically conveys a relatively low level of emotional tension or stress with a short bar having a first color (e.g., green), alone or in combination with the detected word (e.g., "loved") from the dialog which is driving the detected emotional state of the dialog. In similar fashion, the second emotional thermometer 302 graphically conveys a relatively low level of emotional tension or stress with a slightly longer bar having the same color (e.g., green) or possibly a slightly different shade of that color, alone or in combination with the detected word (e.g., "home") which is driving the detected emotional state of the dialog. As the stress or emotion tension in the dialog increases, the third emotional thermometer 303 graphically conveys a medium level of emotional tension or stress with a medium length bar having a second color (e.g., yellow), alone or in combination with the detected dialog word (e.g., "change") driving the detected emotional state. Likewise, the fourth emotional thermometer 304 may be generated which graphically conveys an intermediate level of agitation in the conversation with a slightly longer bar having the same color (e.g., yellow) or possibly a slightly different shade of that color, alone or in combination with the detected dialog word (e.g., "nerve"). Finally, as the stress or emotion tension in the dialog exceeds a threshold level, a fifth emotional thermometer 305 is generated to graphically convey that tensions are mounting and corrective measures should be taken by the agent by displaying a long length bar having a third color (e.g., red), alone or in combination with the detected dialog word (e.g., "sore") driving the detected emotional state. Likewise, the sixth emotional thermometer 306 may be generated which graphically conveys that there is significant distress in the call with a slightly longer bar having the same color (e.g., red) or possibly a slightly different shade of that color, alone or in combination with the detected dialog word (e.g., "frustrated").

Figure 4:
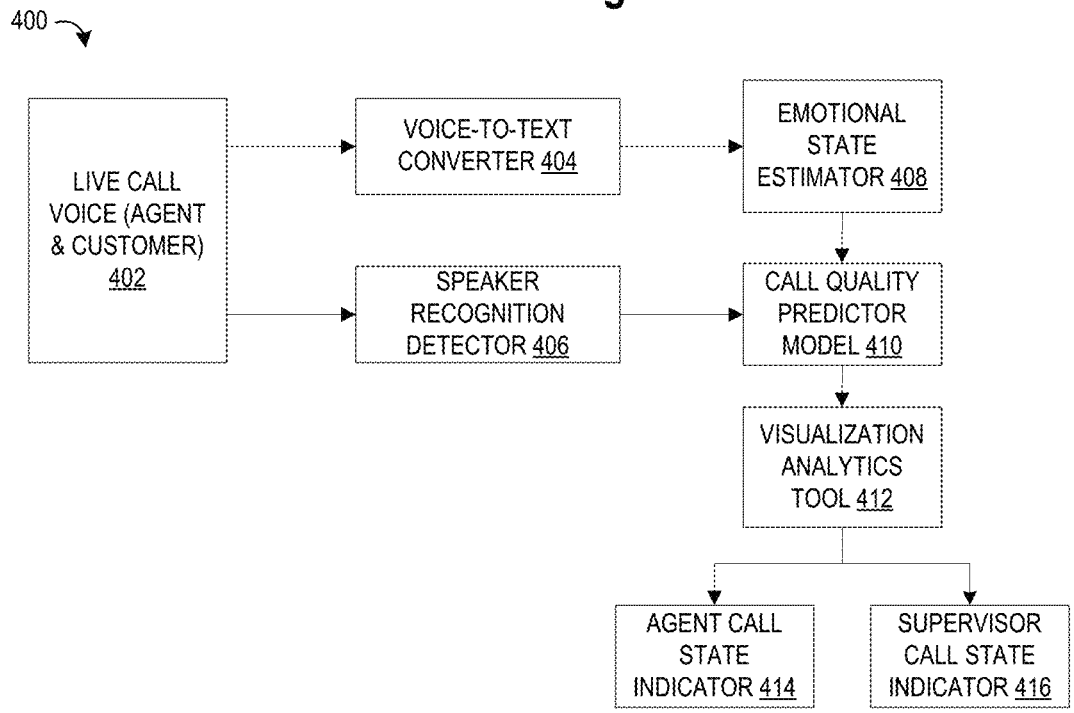
FIG. 4 depicts a system architecture for monitoring and visualizing emotions in call center dialogs in accordance with selected illustrative embodiments of the present disclosure.

To provide additional details for an improved understanding of selected embodiments of the present disclosure, reference is now made to FIG. 4 which depicts a diagrammatic overview of a system architecture 400 for monitoring and visualizing emotions in call center dialogs. The system architecture shown in FIG. 3 may be implemented in whole or in part with a cognitive system, such as the supervisor computing system 10, call center agent workstation 60a, or other natural language processing system. As depicted, the system receives one or more inputs from a live voice call 402, which may include natural language content from a customer service dialog between a customer and a call center agent (which can be either human or a robot agent), though many other embodiments are possible where two or more people engaged in a conversation, including voice (e.g., phone) and text (e.g., instant messaging) modalities. To capture text from a live call 402, a voice-to-text converter 404 may be connected as an Application Programming Interface (API) to provide speech transcription input to the emotional state estimator 408. For example, IBM's "Speech to Text" service can accurately transcribe the human voice by leveraging machine intelligence to combine information about grammar and language structure with knowledge of the composition of the audio signal. In addition, the input(s) from a live voice call 402 may be processed by a speaker recognition detectors 406 which any suitable technique for differentiating between the agent and customer, such as employing a text-independent Gaussian mixture model (GMM) approach, a speaker adaptive automatic speech recognition (ASR) approach, a differentiated signal strength detection approach, spectral separation, or other speaker indicators.

At the emotional state estimator 408, the received input text can be processed with lexicon-based techniques and emotion modeling techniques to extract personal emotion states relating to the call center dialogs from which the input text was extracted. For example, each text word is processed to calculate a corresponding dictionary-based emotional state value for input to the call quality predictor model 410. For example, the emotional state estimator 408 may employ a VAD emotion model to extract valence (or pleasure), arousal and dominance (PAD) dimensional values from the input text as known in the art. Alternatively or additionally, a circumplex model can be used where emotions are distributed in a two-dimensional circular pace of arousal or valence/pleasure. An example of an emotion category model is known in the art as Plutchik's model that defines eight basic emotions or moods. In addition or in the alternative, a dimensional representation of emotion can be estimated by averaging valence, arousal and dominance values (the PAD model) of the emotional words in that appeared in the lexicon. Therefore, the emotion information can be represented by two emotion score vectors, including an emotion category model vector M: $(m_1, m_2, \ldots, m_8)$ and a PAD/VAD emotion model vector P: $(v, a, d)$.

Using the call quality predictor model 410, the received VAD dimensional input values can be processed into a one-dimensional representation of the emotional state by projecting only the valence (or pleasure) and arousal dimensional values onto a two-dimensional emotion vector which can then be characterized with a one-dimensional vector angle a to represent the emotional state of the input text. While the call quality predictor model 410 can generate emotional state values from each detected word in the call center dialog, such an instantaneous and granular representation of the emotional states may occur too rapidly to be of use to the supervisor. Accordingly, selected embodiments may employ an averaging or filtering technique whereby emotional values are averaged over time, such as by applying a combination filter to reflect the cumulative or average emotional state for the dialog over the last n words.

Using the one-dimensional vector angle a representation of the emotional state of the input text, the visualization analytics tool 412 generates a call state indicator for the agent 414 and/or for the supervisor 416. For example, the visualization analytics tool 412 may process the received emotional state vector angle a and associated text from the dialog to dynamically generate the call state indicator as a colored bar graph for displaying the associated text with a color that corresponds to the emotional state vector angle a. When generated for the call center agent 414, the call state indicator may be displayed at the bottom or top of the screen to provide immediate visual feedback on the emotional state of the call without creating visual clutter for the agent. With the agent call state indicator 414, the agent may be provided with visual feedback reflecting their emotional state and/or that of the customer they are in conversation with, to enable the agent to better be aware and control their emotional state, and manage the emotional state of the customer. In addition, the agent call state indicator 414 may be used to provide the agent conversational suggestions to help the agent guide the conversation towards a desired outcome.

When generated for the supervisor 416, the call state indicator for a specific agent may be displayed along with additional call state indicators for other agents being monitored by the supervisor to provide immediate visual feedback on the emotional state of the calls for all supervised agents. In this way, the supervisor can monitor the emotional status of multiple agents engaged in customer conversations, enabling the supervisor to select and listen in on conversations that are emotionally charged (e.g., "problem calls"). As a result of the supervisor call state indicator 416 indicating that the emotional stress of the customer-agent conversation has reached a threshold, the supervisor may be automatically connected with the distressed call to intervene in a conversation that has reached an undesired state. In addition or in the alternative, the supervisor call state indicator 416 can automatically enlist the help of a more appropriate agent by matching the emotional state of the customer with an agent with a more compatible psychological profile. Such automatic call intervention results in improved utilization of supervisors who can proactively monitor those calls that are likely to run into trouble when the customer's frustration and anger are escalating, thereby providing improvements to call center performance as compared to conventional approaches for randomly selecting calls for monitoring by the supervisor which may or may not be problematic calls.

Figure 5:
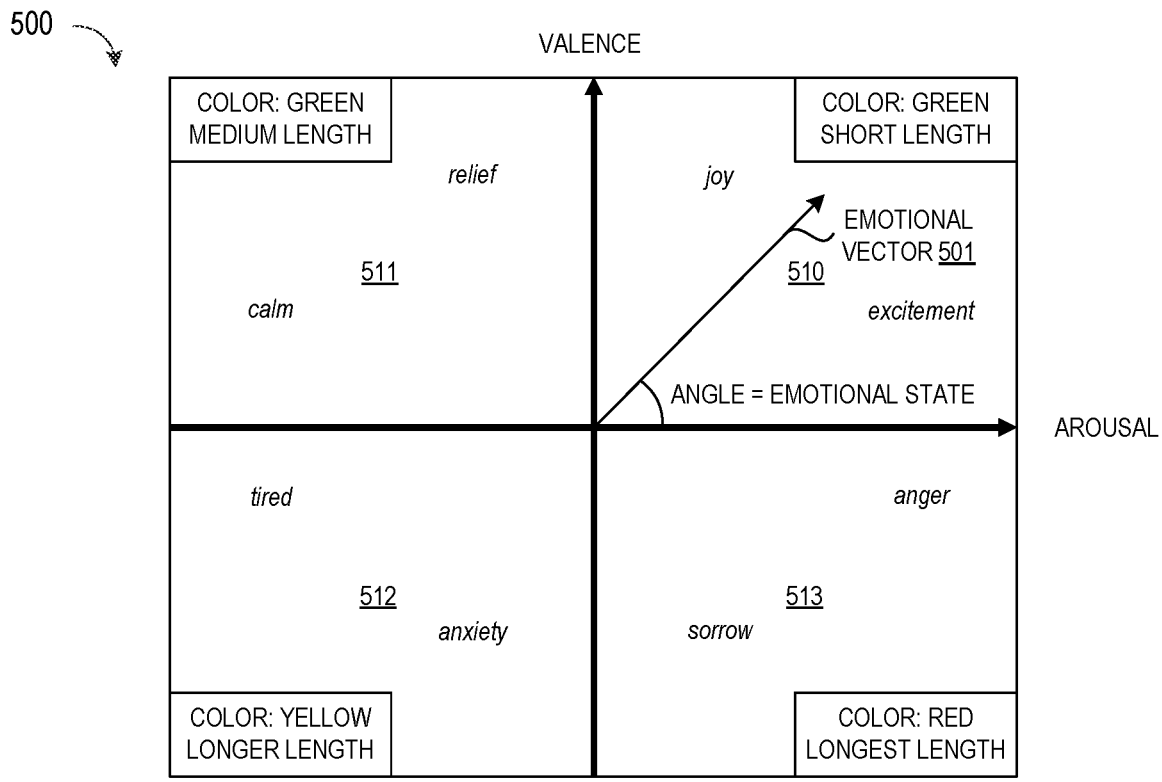
FIG. 5 depicts a graphic representation of an emotional vector formed from valence and arousal values for use in calculating and visualizing an emotional state in accordance with selected illustrative embodiments of the present disclosure.

To provide additional details for an improved understanding of selected embodiments of the present disclosure, reference is now made to FIG. 5 which depicts graphic representation of an emotional vector 501 projected onto a two-dimensional plot 500 of the valence and arousal values for use in calculating and visualizing an emotional state. The processing for generating the emotional vector 501 may be performed by applying the call quality predictor model 410 to the VAD values extracted from the emotional state estimator 408. In selected embodiments, only the valence and arousal values are used to project the emotional vector 510 in cases where the dominance values do not provide a useful input for evaluation the emotional state of a call center dialog.

Depending on the detected valence and arousal values, the emotion vector 501 projects onto a first quadrant 510 which corresponds to a very low level of emotional tension or stress (e.g., a combination of pleasure and high arousal), a second quadrant 511 which corresponds to a relatively low level of emotional tension or stress (e.g., a combination of pleasure and low arousal), a third quadrant 512 which corresponds to a medium level of emotional tension or stress (e.g., a combination of displeasure and low arousal), or a fourth quadrant 513 which corresponds to a relatively high level of emotional tension or stress (e.g., a combination of displeasure and high arousal). In this setting, the angle of the emotional vector 501 provides a one-dimensional indication of the emotional state by indicating which quadrant 510-513 contains the vector 501. And once a quadrant is identified, the visualization analytics tool 412 can translate or map the emotional state angle and/or the quadrant information to a corresponding color and/or length parameter for the call state indicator. For example, emotional vectors which project into the first quadrant 510 may be displayed as call state indicators having a short green bar and emotional vectors which project into the second quadrant 511 may be displayed as call state indicators having a medium length green bar. However, emotional vectors which project into the third quadrant 512 may be displayed as call state indicators having a longer length yellow bar, while emotional vectors which project into the fourth quadrant 513 may be displayed as call state indicators having a longest length red bar.

Figure 6:
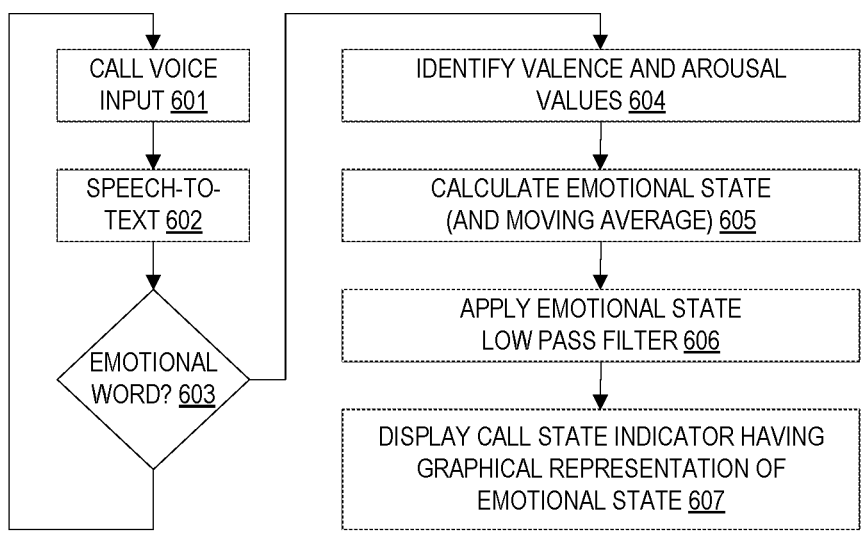
FIG. 6 illustrates a simplified flow chart showing the logic for estimating the emotional state of a call in accordance with selected illustrative embodiments of the present disclosure.

Turning now to FIG. 6, there is illustrated a simplified flow chart 600 showing the logic for estimating the emotional state of a call in accordance with selected illustrative embodiments of the present disclosure. The steps outlined in FIG. 6 may be implemented, for example, by the system architecture 400 in FIG. 4, with steps 601-602 being performed by the voice-to-text generator 404, steps 603-604 being performed by the emotional state estimator 408, steps 605-606 being performed by the call quality predictor model 406, and step 607 being performed by the visualization analytics tool 412, though it will be appreciated that the functionality be allocated in different ways within the system architecture 400.

As shown in FIG. 6, the operation starts with call voice input (step 601) from a detected conversation or dialog between a customer and call center agent which may be a human or bot agent. In selected embodiment, the input at step 601 may include any form of text or audio input, whether captured as audio (e.g., from a phone conversation) or text (e.g., from messages exchanged through a web interface). If required, the call voice input is converted to text with a speech-to-text converter (step 602) for additional processing to determine the emotional content of the resulting text.

The extracted dialog text is then processed to detect emotional words in the text that have associated emotion indicating metrics (step 603), such as by using a semantic model, including an integration of numeric emotion measurements and semantic categories, for example, from emotion lexicons or dictionaries. For example, the semantic model employed at step 603 can include a combined valence, arousal, dominance (VAD) emotion model which is used to identify valence and arousal values for each word or text (step 604).

At step 605, the emotional indicating metrics are combined to produce an emotional state value, such as by calculating an emotional state for an individual (e.g., the customer or agent) or for the dialog from spoken words that have significant valence V and arousal A scores. In selected embodiments, the emotional state $E_t$ for a given time t is computed as the arctangent of the angle for the emotion model vector $P_t$: (V, A). In other words, $E_t$=arctan(V/A). To smooth the computed values for the computed emotional state values, the processing at step 605 may include computing a moving average of the emotional state. If the emotional state visualization responded instantaneously to the emotional state, the visualization would change too frequently to be useful, especially when the visualizations from a plurality of individuals are displayed.

To present a more acceptable visualization, the computed emotional state values may be processed to generate filtered emotional state (FES) values (at step 606), though the amount of filtering should be balanced so that rapid changes of emotions are not lost (if too much filtering is used) and so that the display of emotional states is not overwhelming (if too little filtering is used). To balance these considerations, the processing at step 606 may apply a low pass filter to capture quick rises in anger (an emotion of particular concern for customer service applications) with a slow reduction in display output as anger subsides. To accomplish this, the low pass filter may be configured as a dual slope filter having two filter constants, including Fc, the emotional charge constant, when anger is detected, and Fd, the emotional discharge constant, when anger is not detected. With separate charge and discharge rates, the filter performance is controlled so that increases in the detected emotional stress are rapidly reflected in the computed emotional state values, while reductions in the detected emotional stress are reflected more slowly in the computed emotional state values. Using the following equation for a one-pole low pass filter to implement this low pass filter functionality at step 606, the call quality predictor model 410 may implement an emotional state filter with control logic or code for computing the filtered emotional state (e.g., $E_{t+1}$) based on whether the current emotional state $E_t$ exceeds the previous emotional state $E_{t-1}$ as follows:

$$\text{if } (E_t > E_{t-1})$$
$$E_{t+1} = E_{t-1} * (1-Fc) + E_t * Fc$$
$$\text{else}$$
$$E_{t+1} = E_{t-1} * (1-Fd) + E_t * Fd$$

where E is a one-dimensional representation of the emotional state for the dialog (e.g., −1=joy to 1=anger), Fc is the emotional charge constant, Fd is the emotional discharge constant, and where Fc>Fd. In this equation, Fc is employed when the current emotional state ($E_t$) is greater than the previous emotional state ($E_{t-1}$), and Fd is employed when the current emotional state ($E_t$) is less than the previous emotional state ($E_{t-1}$).

At step 607, a call state indicator is displayed which includes a graphical representation of the filtered emotional state. In selected embodiments, the graphical representation of the call state indicator may be a colored bar with a variable length to indicate the level of emotional stress in the call center call. To provide the call state indicator at step 607, the visualization analytics tool 412 may include control logic or code for computing a bar length value as a function of the filtered emotional state (e.g., Bar Length=filtered emotional state (FES)). In addition or in the alternative, a color for the call state indicator may be generated by using the filtered emotional state (FES) value to compute a color combination factor a which controls the combination of red and green values, depending on where or not a exceeds a threshold (e.g., a<128) by implementing the following equation with the control logic or code:

```
a=255*FES/360
if a<128
    red=2*a
    green=255
else
    red=255
    green=511−2*a
```

Figure 7:
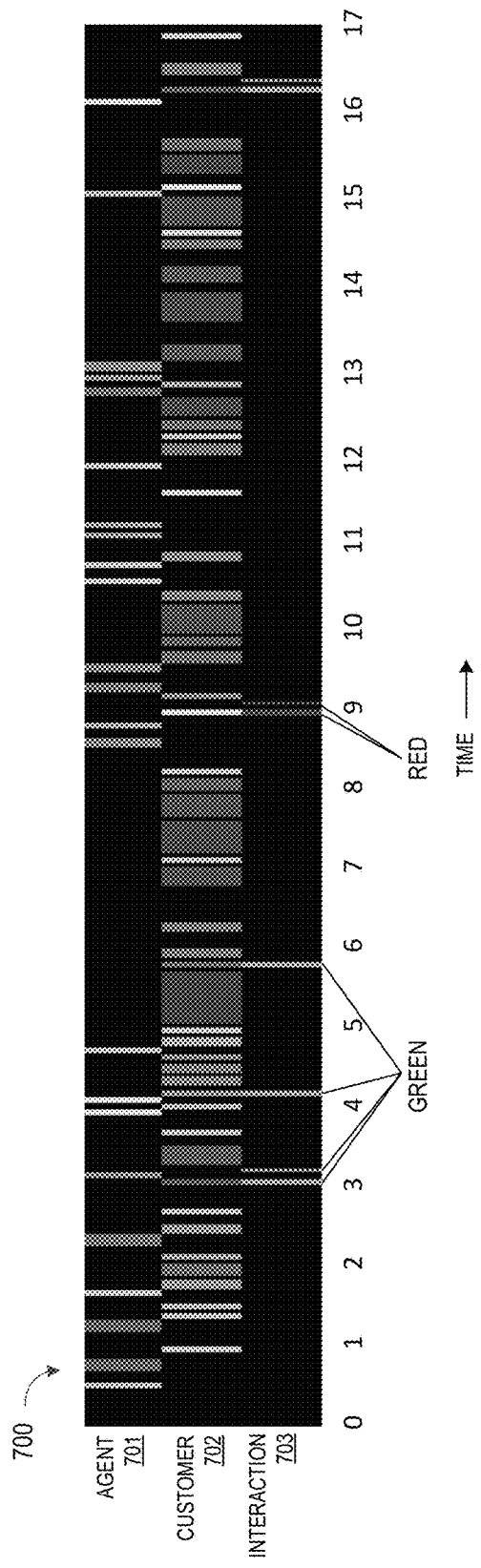
FIG. 7 shows a simplified visual representation of the emotional state of a customer dialog with a time line of the instantaneous emotional states of an agent and customer and associated instantaneous emotional interaction values for communications between the customer and agent in accordance with selected illustrative embodiments of the present disclosure.

In embodiments wherein a supervisor is monitoring a plurality of call center agents, the call state indicator for each agent provides an instantaneous estimate of the emotional state for that agent's conversation. Since an instantaneous estimate may not provide a full and complete representation of the conversation, the call state indicator may be configured as an interactive link on the supervisor's display to retrieve and display a more complete, historical description of the conversation. For example, reference is now made to FIG. 7 which shows a time line 700 which visually depicts the emotional state of a customer dialog over time (e.g., a 17 minute interval). As illustrated, the timeline 700 shows the estimated or measured emotional states of the agent 701 (in the top trace) and the customer 702 (in the middle trace) which are generated by separately converting the verbal conversation of the agent and customer to text, maintaining the separation of the two speakers. For each conversation turn, the text is analyzed for instantaneous emotional content which is then converted for display as a single color which may be a combination of red, blue and green in proportion to the anger, fear, and joy/happiness average for the conversation term, respectively. To provide additional insight into the respective contributions of the agent and customer to the emotional tenor of the conversation, the timeline 700 may also display the instantaneous emotional interaction values 703 (in the bottom trace) which may be generated to show the interaction of the agent and customer for the conversation. In selected embodiments, each interaction value represents the comparison of the anger of the customer to the response anger of the agent, with red indicating the agent's response to the customer exhibits significantly greater anger than the customer's anger, and green indicating the anger content of the agent's response is significantly lower than the customer's anger content of their last utterance, as established by a threshold.

Figure 8:
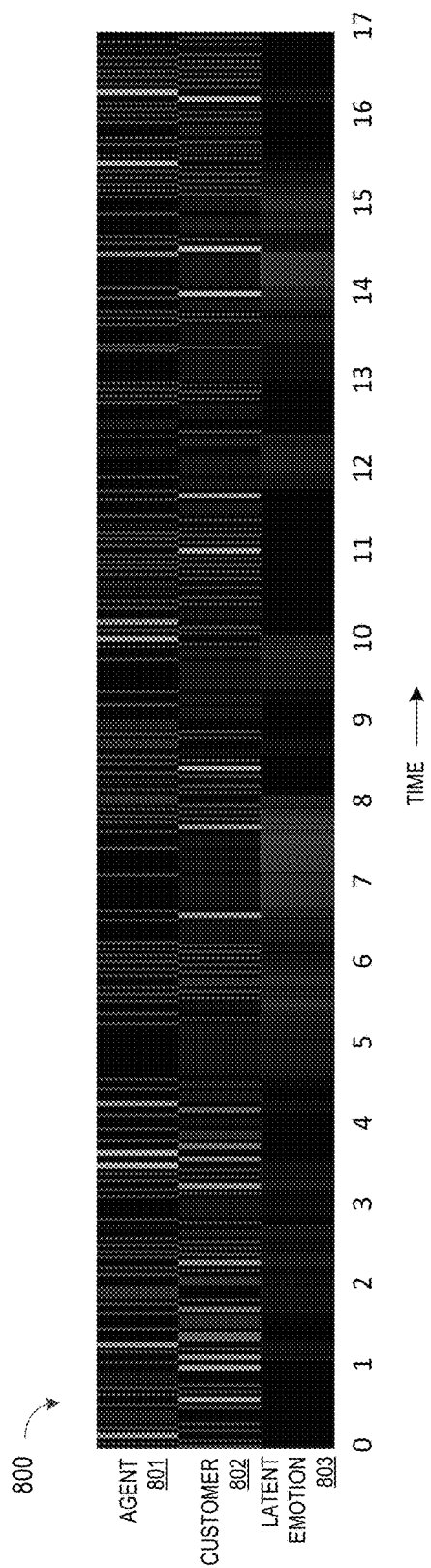
FIG. 8 shows a simplified visual representation of the emotional state of a customer dialog with a time line of the instantaneous emotional states of an agent and customer and associated latent emotional state of the customer in accordance with selected illustrative embodiments of the present disclosure.

Even with the depiction of historical emotional states and corresponding instantaneous interactions between the customer and agent, the emotional state of the dialog may not be fully conveyed since the effects of emotionally laden words may persist in the mind of the participant after the word occurs in the conversation. For example, if a customer is angry and expresses this anger with emotional words (e.g. "I really hate your customer service"), their internal state of anger can persist as they continue to describe what is making them angry, even though the description does not contain angry indicating words. To capture this internal (or latent) sense of the conversation's emotional status, an emotional filter may be applied to capture latent emotions and see how the latent emotions change over time (e.g., to see if the latent anger of the customer subsides over the duration of the call or if the agent exacerbates the customer's anger). This information may be visually conveyed to the supervisor by configuring the call state indicator as an interactive link which may be activated by the supervisor to retrieve and visually display the emotional states that persist being beyond the verbal or textural expression of emotions. For example, reference is now made to FIG. 8 which shows a time line 800 which visually depicts the emotional state of a customer dialog over time (e.g., a 17 minute interval), along with an associated latent emotional state of the customer. As illustrated, the timeline 800 shows the estimated or measured emotional states of the agent 801 (in the top trace) and the customer 802 (in the middle trace) which are generated by separately converting the verbal conversation of the agent and customer to text. For each conversation turn, the text is analyzed for instantaneous emotional content which is then averaged and displayed as a single color, indicating the dominant emotion (winner-take-all) of anger (red), fear (blue) or happiness (green). To provide additional insight into the latent emotional tenor of the conversation, the timeline 800 may also display the latent emotional interaction values 803 (in the bottom trace) which may be generated by applying an emotional filter for a particular emotion (e.g., anger in this case). For example, the latent emotional state ($L_t$) may be modeled as:

$$L_t = L_{t-1}*(1-F)+(Act-K*H_{t-1})*F$$

where $L_{t-1}$ is the previous customer latent emotional state, F is a customer anger inertia constant, Act is the average anger of the customer in the current turn, K is the agent comforting constant, and $H_{t-1}$ is the agent's last turn happiness average. In this example embodiment, each latent anger value represents the comparison of the anger of the customer to the response anger of the agent, with red indicating the agent's response to the customer exhibits greater anger than the customer's anger, and green indicating the anger content of the agent's response is lower than the customer's anger content of their last utterance.

As disclosed herein, illustrative embodiments provide mechanisms for monitoring and displaying the emotional state of one or more participants engaged in a conversation (e.g., a call center dialog), but also provides mechanisms for presenting the emotional state (along with conversational suggestions) as visual feedback to the participant(s) or to a third party (e.g., supervisor) who may monitor and intervene in the conversation to improve the quality and outcome of conversations. As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

By now, it will be appreciated that there is disclosed herein a system, method, apparatus, and computer program product for monitoring an emotional state of a conversation at an information handling system having a processor and a memory. As disclosed, the system, method, apparatus, and computer program monitor a communication between a first person (e.g., a human or a machine) and a second person (e.g., a customer) to determine an emotional state of the communication. In selected embodiments, the communication may be a call center dialog between a customer and call center agent that is monitored by identifying textual content in the call center dialog, and then analyzing the textual content for emotion content using a semantic model to evaluate a valence and arousal emotion measurements for the textual content. The information handling system may then provide a visual representation of the emotional state of the communication for display to a person having access to the communication, such as a call center supervisor or call center agent, to provide substantially real-time visual feedback of the emotional state of the communication to assist said person to monitor and alter the emotional state of the communication. In selected embodiments, the visual representation is displayed as a call state indicator bar having a color corresponding to the emotional state of the communication, such as by transforming the valence and arousal emotion measurements for the textual content (but not any dominance emotion measures) into an emotional vector, measuring an angle associated with the emotional vector, and computing the color from the angle. In addition, the visual representation may be displayed with a history of emotional states of the communication along with corresponding instantaneous emotional state measurements and/or latent emotional state measurements for the communication to visually convey emotion patterns for the communication over time. In addition or in the alternative, the visual representation may be displayed as a plurality of call state indicator bars for a corresponding plurality of communications for viewing by a supervisor having access to the plurality of communications. Subsequently, an intervention action may be performed to improve the emotional state of the communication in response to detecting the emotional state of the communication meets one or more specified intervention criteria. In selected embodiments, the intervention action may be performed by notifying the second person or a supervisor for the second person, replacing the second person with a third person, and/or providing the second person with one or more conversational suggestions to help guide the communication towards a desired outcome.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of monitoring an emotional state of a communication, the method comprising:
   monitoring, by an information handling system comprising a processor and a memory, a communication to identify dialog words from the communication;
   analyzing, by the information handling system, the dialog words to detect emotional words that have associated emotion-indicating metrics by using a semantic model which provides numeric emotion measurements and semantic categories for each dialog word;
   combining, by the information handling system, the emotion-indicating metrics for each dialog word to produce emotional state values for the communication;
   applying, by the information handling system, an emotional state low pass filter to the emotional state values using control logic or code to compute a filtered emotional state value ($E_{t+1}$) for the communication based on whether a current emotional state value $E_t$ for the communication exceeds a previous emotional state value $E_{t-1}$ for the communication; and
   providing, by the information handling system, a call state indicator comprising a visual representation of the emotional state of the communication that is derived from the filtered emotional state value ($E_{t+1}$).

2. The method of claim 1, where analyzing the dialog words comprises using a semantic model to identify valence, arousal, and dominance values for each dialog word.

3. The method of claim 2, where combining the emotion-indicating metrics comprises projecting valence, arousal and dominance values for each dialog word onto a two-dimensional emotional vector comprising only valence and arousal values and then computing a one-dimensional vector angle from the two-dimensional emotional vector to represent the emotional state value for each dialog word.

4. The method of claim 3, where providing the call state indicator comprises displaying a call state indicator bar having a color corresponding to the one-dimensional vector angle representing the emotional state of the communication.

5. The method of claim 3, where providing the call state indicator comprises displaying a call state indicator bar having a length corresponding to the one-dimensional vector angle representing the emotional state of the communication.

6. The method of claim 3, where combining the emotion-indicating metrics comprises computing, by the information handling system, an emotional state $E_t$ for a given time t as an arctangent of the one-dimensional vector angle for the two-dimensional emotional vector comprising only valence and arousal values.

7. The method of claim 1, where applying the emotional state low pass filter comprises applying a dual slope low pass filter having different filter constants so that changes in the detected emotional state values indicating an increase in emotional stress are rapidly reflected in the filtered emotional state values and so that changes in the detected emotional state values indicating an decrease in emotional stress are more slowly reflected in the filtered emotional state values.

8. A computer program product comprising a computer readable storage medium having a computer readable program stored therein, wherein the computer readable program, when executed on an information handling system, causes the system to monitor an emotional state of a communication by:
monitoring a communication to identify dialog words from the communication;
analyzing the dialog words to detect emotional words that have associated emotion-indicating metrics by using a semantic model which provides numeric emotion measurements and semantic categories for each dialog word;
combining the emotion-indicating metrics for each dialog word to produce emotional state values for the communication;
applying an emotional state low pass filter to the emotional state values using control logic or code to compute a filtered emotional state value ($E_{t+1}$) for the communication based on whether a current emotional state value $E_t$ for the communication exceeds a previous emotional state value $E_{t-1}$ for the communication; and
providing a call state indicator comprising a visual representation of the emotional state of the communication that is derived from the filtered emotional state value ($E_{t+1}$).

9. The computer program product of claim 8, wherein the computer readable program, when executed on the system, causes the system to analyze the dialog words by using a semantic model to identify valence, arousal, and dominance values for each dialog word.

10. The computer program product of claim 9, wherein the computer readable program, when executed on the system, causes the system to combine the emotion-indicating metrics by projecting valence, arousal and dominance values for each dialog word onto a two-dimensional emotional vector comprising only valence and arousal values and then computing a one-dimensional vector angle from the two-dimensional emotional vector to represent the emotional state value for each dialog word.

11. The computer program product of claim 10, wherein the computer readable program, when executed on the system, causes the system to provide the call state indicator by displaying a call state indicator bar having a color corresponding to the one-dimensional vector angle representing the emotional state of the communication.

12. The computer program product of claim 10, wherein the computer readable program, when executed on the system, causes the system to provide the call state indicator by displaying a call state indicator bar having a length corresponding to the one-dimensional vector angle representing the emotional state of the communication.

13. The computer program product of claim 10, wherein the computer readable program, when executed on the system, causes the system to combine the emotion-indicating metrics by computing an emotional state $E_t$ for a given time t as an arctangent of the one-dimensional vector angle for the two-dimensional emotional vector comprising only valence and arousal values.

14. The computer program product of claim 8, wherein the computer readable program, when executed on the system, causes the system to apply the emotional state low pass filter by applying a dual slope low pass filter having different filter constants so that changes in the detected emotional state values indicating an increase in emotional stress are rapidly reflected in the filtered emotional state values and so that changes in the detected emotional state values indicating an decrease in emotional stress are more slowly reflected in the filtered emotional state values.

15. An information handling system comprising:
one or more processors;
a memory coupled to at least one of the processors;
a set of instructions stored in the memory and executed by at least one of the processors to monitor an emotional state of a communication, wherein the set of instructions are executable to perform actions of:
monitoring, by the system, a communication to identify dialog words from the communication;
analyzing, by the system, the dialog words to detect emotional words that have associated emotion-indicating metrics by using a semantic model which provides numeric emotion measurements and semantic categories for each dialog word;
combining, by the system, the emotion-indicating metrics for each dialog word to produce emotional state values for the communication;
applying, by the system, an emotional state low pass filter to the emotional state values using control logic or code to compute a filtered emotional state value ($E_{t+1}$) for the communication based on whether a current emotional state value $E_t$ for the communication exceeds a previous emotional state value $E_{t-1}$ for the communication; and
providing, by the system, a call state indicator comprising a visual representation of the emotional state of the communication that is derived from the filtered emotional state value ($E_{t+1}$).

16. The information handling system of claim 15, where analyzing the dialog words comprises using a semantic model to identify valence, arousal, and dominance values for each dialog word.

17. The information handling system of claim 16, where combining the emotion-indicating metrics comprises projecting valence, arousal and dominance values for each dialog word onto a two-dimensional emotional vector comprising only valence and arousal values and then computing a one-dimensional vector angle from the two-dimensional emotional vector to represent the emotional state value for each dialog word.

18. The information handling system of claim 17, where providing the call state indicator comprises displaying a call state indicator bar having a color and/or length corresponding to the one-dimensional vector angle representing the emotional state of the communication.

19. The information handling system of claim 17, where combining the emotion-indicating metrics comprises computing an emotional state $E_t$ for a given time t as an arctangent of the one-dimensional vector angle for the two-dimensional emotional vector comprising only valence and arousal values.

20. The information handling system of claim 15, where applying the emotional state low pass filter comprises applying a dual slope low pass filter having different filter constants so that changes in the detected emotional state values indicating an increase in emotional stress are rapidly reflected in the filtered emotional state values and so that changes in the detected emotional state values indicating an decrease in emotional stress are more slowly reflected in the filtered emotional state values.

\* \* \* \* \*